(12) United States Patent
Ziserman et al.

(10) Patent No.: US 12,543,735 B2
(45) Date of Patent: Feb. 10, 2026

(54) SOLUBLE LIQUID COMPOSITIONS OF SAFLUFENACIL, METHOD OF PREPARATION AND USE THEREOF

(71) Applicants: Adama Agan Ltd., Ashdod (IL); Lior Ziserman, Holon (IL); Daniel Meliker, Ariel (IL); Sergio Nahmoud, Ashdod (IL)

(72) Inventors: Lior Ziserman, Holon (IL); Daniel Meliker, Ariel (IL); Sergio Nahmoud, Ashdod (IL)

(73) Assignee: ADAMA AGAN LTD., Ashdod (IL)

(*) Notice: Subject to any disclaimer, the term of this patent is extended or adjusted under 35 U.S.C. 154(b) by 621 days.

(21) Appl. No.: 17/681,640

(22) PCT Filed: Aug. 25, 2020

(86) PCT No.: PCT/IB2020/057936
§ 371 (c)(1),
(2) Date: Feb. 25, 2022

(87) PCT Pub. No.: WO2021/038439
PCT Pub. Date: Mar. 4, 2021

(65) Prior Publication Data
US 2023/0309560 A1  Oct. 5, 2023

Related U.S. Application Data

(60) Provisional application No. 62/891,902, filed on Aug. 26, 2019.

(51) Int. Cl.
*A01N 43/54* (2006.01)
*A01N 25/04* (2006.01)
(Continued)

(52) U.S. Cl.
CPC ............ *A01N 43/54* (2013.01); *A01N 25/04* (2013.01); *A01N 39/04* (2013.01); *A01P 13/00* (2021.08)

(58) Field of Classification Search
CPC ...................................... A01N 43/54
See application file for complete search history.

(56) References Cited

U.S. PATENT DOCUMENTS

| 9,585,393 B2* | 3/2017 | Kirkpatrick ............ A01N 43/54 |
| 2011/0105326 A1* | 5/2011 | Begliomini ............ A01N 57/20 |
| | | 504/105 |

(Continued)

FOREIGN PATENT DOCUMENTS

| CN | 108432803 A * | 8/2018 |
| WO | WO 2011/113786 A2 | 9/2011 |

(Continued)

OTHER PUBLICATIONS

Roskamp, J. et al., "The Influence of Carrier Water pH and Hardness on Saflufenacil Efficacy and Solubility", Weed Technology, 2013, 27 (3): 527-533. (Year: 2013).*

(Continued)

*Primary Examiner* — Gina C Justice
(74) *Attorney, Agent, or Firm* — Gary J. Gershik

(57) ABSTRACT

The present invention relates to a soluble liquid (SL) composition comprising saflufenacil and an organic base. Optionally, the composition further comprises at least one agriculturally acceptable carrier and/or additives. The present invention further relates to a use of an amine salt of saflufenacil for preparing a soluble liquid composition.

17 Claims, 5 Drawing Sheets

(51) Int. Cl.
    *A01N 39/04* (2006.01)
    *A01P 13/00* (2006.01)

(56) References Cited

U.S. PATENT DOCUMENTS

2013/0157860 A1    6/2013    Inaba
2015/0045216 A1    2/2015    Hennen et al.
2019/0075787 A1*   3/2019    Asirvatham ........... A01N 53/00

FOREIGN PATENT DOCUMENTS

WO    WO 2011/113786 A3    9/2011
WO    WO 2015/091642 A1    6/2015

OTHER PUBLICATIONS

International Preliminary Report on Patentability, including Written Opinion of the International Searching Authority, issued Mar. 8, 2022 in connection with PCT International Application No. PCT/IB2020/058268.
International Search Report issued Oct. 22, 2020 in connection with PCT International Patent Application No. PCT/IB2020/057936.
Notification of Transmittal of the International Search Report and the Written Opinion of the International Searching Authority, or the Declaration issued Oct. 22, 2020 in connection with PCT International Patent Application No. PCT/IB2020/057936.
Soltani, N. et al., "Response of Corn to Preemergence and Postemergence Applications of Saflufenacil". *Weed Technology*, 2009, vol. 23, pp. 331-334.
Written Opinion of the International Searching Authority issued Oct. 22, 2020 in connection with PCT International Patent Application No. PCT/IB2020/057936.
Chinese Office Action issued Sep. 30, 2024 in connection with Chinese Patent Application No. 2020800605987.
Colombian Office Action issued Jul. 16, 2024 in connection with Colombian Patent Application No. NC2022/0001864.
Israeli First Examination Report issued Jun. 9, 2024 in connection with Israeli Patent Application No. 290651.

* cited by examiner

SOLUBLE LIQUID COMPOSITIONS OF SAFLUFENACIL, METHOD OF PREPARATION AND USE THEREOF

CROSS-REFERENCE TO RELATED APPLICATIONS

This application is a § 371 national stage of PCT International Application No. PCT/IB2020/057936, filed Aug. 25, 2020, claiming the benefit of U.S. Provisional Application No. 62/891,902, filed Aug. 26, 2019, the entire contents of each of which are hereby incorporated by reference into the subject application.

TECHNICAL FIELD OF THE INVENTION

The present invention relates to a soluble liquid (SL) composition comprising saflufenacil and an organic base. Optionally, the composition further comprises at least one agriculturally acceptable carrier and/or additives. The present invention further relates to a use of an amine salt of saflufenacil for preparing a soluble liquid composition.

BACKGROUND OF THE INVENTION

Saflufenacil, having the chemical name 2-chloro-5-[3,6-dihydro-3-methyl-2,6-dioxo-4-(trifluoromethyl)-1(2H-pyrimidinyl]-4-fluoro-N-[[methyl(1-methylethyl)amino]sulfonyl]benzamide, has the following structural formula (I):

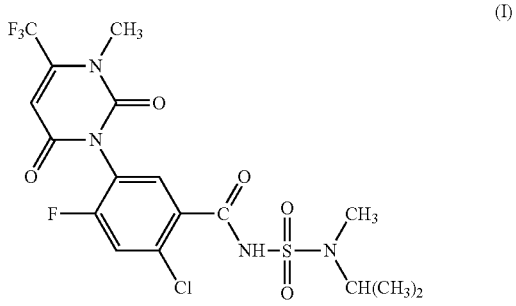 [SMILES: CC(C)N(C)S(=O)(=O)NC(=O)c1cc(-n2c(=O)cc(C(F)(F)F)n(C)c2=O)c(F)cc1Cl]

Saflufenacil belongs to the pyrimidindione and/or phenyluracil chemical groups and is used as an herbicide, in particular as a foliar contact and residual broad-leaved weed herbicide. It is absorbed by foliage and roots with translocation in the apoplast and limited movement in the phloem. Saflufenacil is applied to foliage and is used for residual control of broad-leaved weeds, including glyphosate- and ALS-resistant biotypes. Saflufenacil is an inhibitor of protoporphyrinogen oxidase and is applied pre-emergence in corn and sorghum, at 50-125 g/ha; and is applied pre-plant for rapid foliar burn-down in soybeans, cereals, cotton, legumes, and post-directed in tree fruit and nuts, at 18-25 g/ha.

Saflufenacil is disclosed in WO 2001/083459. Further processes for its preparation are disclosed in WO 2003/097589, WO 2005/054208 and WO 2006/097589 and the earlier international application PCT/EP2006/062414.

Saflufenacil prepared by these aforementioned processes is amorphous and is extremely difficult to formulate.

Saflufenacil is barely soluble in various liquid media, thus making it a challenge to create a stable liquid formulation. In particular, saflufenacil has the tendency to precipitate from most solvents, organic or aqueous media; the solubility of saflufenacil in water at pH 5 is 0.0025 g/100 mL and at pH 7 is 0.21 g/100 mL, both at 20° C. In acetonitrile, saflufenacil has a solubility of 19.4 g/100 mL at 20° C. In acetone, saflufenacil has a solubility of 27.5 g/100 mL at 20° C. In ethyl acetate, saflufenacil has a solubility of 6.55 g/100 mL at 20° C. In tetrahydrofurane, saflufenacil has a solubility of 36.2 g/100 mL at 20° C. In methanol, saflufenacil has a solubility of 2.98 g/100 mL at 20° C. In isopropyl alcohol, saflufenacil has a solubility of 0.25 g/100 mL at 20° C. In toluene, saflufenacil has a solubility of 0.23 g/100 mL at 20° C. In 1-octanol, saflufenacil has a solubility of <0.01 g/100 mL at 20° C. In n-heptane saflufenacil has a solubility of <0.005 g/100 mL at 20° C.

Furthermore, the two crystalline modifications of saflufenacil, known in the art, saflufenacil form II and crystalline form of saflufenacil hydrate, disclosed in WO 2008/043835 and WO 2008/043836, are poorly soluble in aqueous media which can cause a problem for formulations.

Therefore, there is a need in the art for water-free saflufenacil formulations in a non-aqueous media that exhibit improved properties, including, for example, improved stability and solubility in water.

SUMMARY OF THE INVENTION

The present invention provides a soluble liquid (SL) composition comprising (i) an amount of saflufenacil, and (ii) an amount of an organic base.

The subject invention also provides a soluble liquid (SL) composition comprising (i) an amount of saflufenacil, (ii) an amount of 2,4-D, and (iii) an amount of on organic base.

The present invention also provides a combination comprising:
(i) an amount of saflufenacil, and
(ii) an amount of an organic base.

The present invention also provides a combination comprising:
(i) an amount of any one of the SL compositions disclosed herein, and
(ii) an amount of at least one additional pesticide.

The present invention also provides a combination comprising:
(i) an amount of any one of the SL compositions disclosed herein, and
(ii) an amount of at least one additional pesticide,
wherein the combination is more effective for controlling and/or preventing pest than when each pesticide at the same amount is applied alone.

The present invention also provides a combination comprising:
(i) an amount of any one of the SL compositions disclosed herein, and
(ii) an amount of at least one additional pesticide,
wherein the amount of saflufenacil and the amount of the additional pesticide(s) when applied together is more effective for controlling and/or preventing pest than when each pesticide at the same amount is applied alone.

The present invention also provides a combination comprising:
(i) an amount of any one of the SL compositions disclosed herein, and
(ii) an amount of at least one additional pesticide,
wherein the amount of saflufenacil in the combination is less than the pesticidally effective amount of saflufenacil when saflufenacil is used alone, and/or wherein the amount of the additional pesticide(s) in the combination is less than the pesticidally effective amount of the additional pesticide(s) when the additional pesticide(s) is used alone.

The present invention also provides a mixture comprising any one of the combinations disclosed herein.

The present invention also provides a SL composition comprising any one of the combinations or mixtures disclosed herein.

The present invention also provides a method of controlling and/or preventing pest comprising applying an effective amount of any one of the SL compositions, combinations or mixtures disclosed herein, to a locus where the pest is to be controlled and/or prevented so as to thereby control and/or prevent the pest.

The present invention also provides a method for controlling weed comprising applying an effective amount of any one of the SL compositions, combinations or mixtures disclosed herein to a locus where the weed is to be controlled so as to thereby control the weed.

The present invention also provides a method of controlling weed in a field of crop comprising applying an effective amount of any one of the SL compositions, combinations or mixtures disclosed herein to a field of crop so as to thereby control the weed in the field of crop.

The present invention also provides use of any one of the SL compositions, combinations or mixtures disclosed herein for controlling and/or preventing pest comprising applying an effective amount of any one of the SL compositions, combinations or mixtures disclosed herein, to a locus where the pest is to be controlled and/or prevented.

The present invention also provides use of any one of the SL compositions or mixtures disclosed herein for controlling weed comprising applying an effective amount of any one of the SL compositions, combinations or mixtures disclosed herein to a locus where the weed is to be controlled.

The present invention also provides any one of the SL compositions, combinations or mixtures disclosed herein for use in controlling and/or preventing pest comprising applying any one of the SL compositions, combinations or mixtures disclosed herein, to a locus where the pest is to be controlled and/or prevented.

The present invention also provides any one of the SL compositions or mixtures disclosed herein for use in controlling weed comprising applying an effective amount of any one of the SL compositions, combinations or mixtures disclosed herein to a locus where the weed is to be controlled.

The present invention also provides a package comprising any one of the SL compositions, combinations or mixtures disclosed herein.

The present invention also provides a use of an amine salt of saflufenacil for preparing a soluble liquid composition.

The present invention also provides an amine salt of saflufenacil for use in preparing a soluble liquid composition.

The present invention also provides a process for preparing any one of the SL compositions disclosed herein, wherein the process comprises:
(i) obtaining the amount of saflufenacil and the amount of the organic base,
(ii) mixing the saflufenacil and the organic base obtained in step (i) to obtain the SL composition.

DETAILED DESCRIPTION OF THE INVENTION

Figure 1:
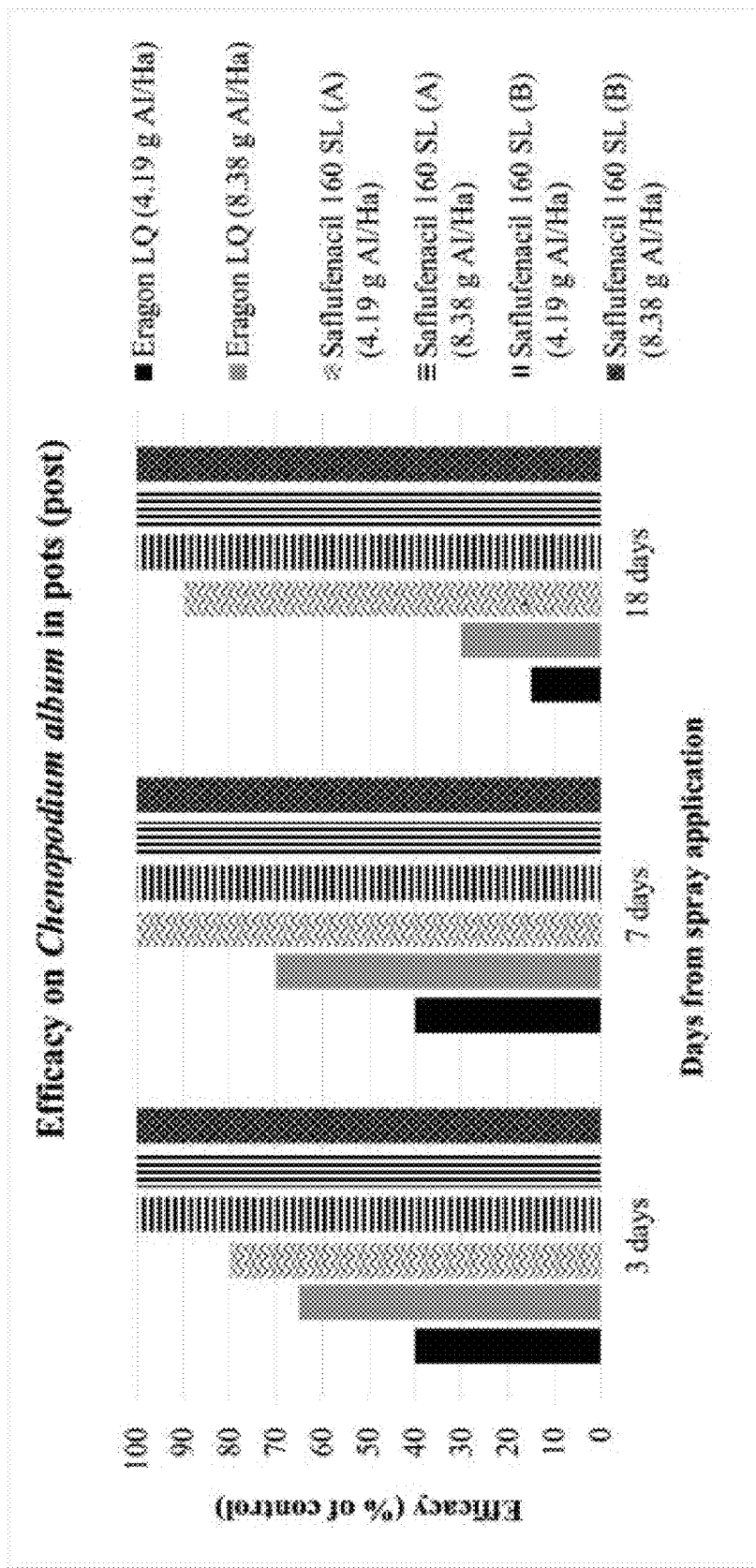
FIG. 1 shows the efficacy of Eragon® LQ, Saflufenacil 160 SL (A) and Saflufenacil 160 SL (B) on *Chenopodium album* at 3 days, 7 days and 18 days after post-emergence spray application.

SL compositions are convenient to use as they may be directly applied after dilution with water. SL compositions of saflufenacil are challenging to formulate because saflufenacil is not soluble in water or many other solvents commonly used in agricultural formulations. Moreover, saflufenacil is chemically sensitive to water at neutral or basic pH.

A novel soluble liquid composition of saflufenacil is described herein. This novel soluble liquid composition comprises saflufenacil and an organic base. Without wishing to be bound by any theory, it is hypothesized that the saflufenacil and the organic base form a complex based on electrostatic forces between the saflufenacil and the organic base and the stereochemical properties of saflufenacil. The formation of the complex stabilizes the saflufenacil in the presence of water. The saflufenacil-organic base complex has a high degree of solubility in water. The formulation of the complex also prevents sedimentation of saflufenacil in the SL composition and after of the SL composition is diluted with water. This novel soluble liquid composition also allows for high load saflufenacil compositions.

Definitions

Unless defined otherwise, all technical and scientific terms used herein have the meaning commonly understood by persons of ordinary skill in the art to which this subject matter pertains.

As used herein, the term "composition" includes a mixture or mixtures of the crystalline form of saflufenacil with another component, such as an organic base. In some embodiments, the composition may comprise at least one additional pesticide.

As used herein, the term "soluble liquid composition" or "SL composition" refers to a liquid, homogeneous formulation. Dilution of a SL composition in water results in a clear solution. Preferably, the SL composition is free of water. Preferably, the SL composition comprises an organic base and the active ingredient, e.g. saflufenacil, is dissolved in the organic base.

As used herein, the term "high load" when used in connection with a composition or a SL composition means that the amount of saflufenacil dissolved in the organic base of the composition is greater than 7% by weight based on the total weight of the composition.

As used herein, the term "agriculturally acceptable carrier" refers to a solvent which is known and accepted in the art for the formation of compositions for agricultural or horticultural use.

As used herein, the term "additive" refers to any substance that itself is not an active ingredient but is added to the composition. Examples of additives includes, but are not limited to, adjuvants, surfactants, emulsifiers, anti-freeze agents, anti-foam agents, and preservatives.

As used herein, the term "excipient" refers to any chemical which has no significant pesticidal activity, such as surfactant(s), solvent(s), or adjuvant(s). One or more excipients can be added to any composition disclosed herein.

As used herein, the term "stable" when used in connection with a composition means that the composition is physically stable and chemically stable. As used herein, the term "chemically stable" means that no significant decomposition of the active components was observed after at least 2 weeks of storage in a sealed package at a temperature of 54° C. As used herein, the term "physically stable" means that no significant sedimentation was observed after at least 2 weeks of storage in a sealed package at a temperature of 54° C.

Stability may be assessed according to test protocol established by the Collaborative International Pesticides Analytical Council Ltd. (CIPAC). Stability can be assessed under normal storage conditions which is after two years storage at room temperature. Stability can also be assessed under accelerated storage conditions which is after 2 weeks storage at 54° C. or after 8 weeks at 40° C. or after 12 weeks at 35° C. or after 3 months at room temperature or at after 2 weeks at 0° C.

As used herein, the term "mixture" refers, but is not limited, to a combination in any physical form, e.g., blend, solution, alloy, or the like.

As used herein, the term "combination" means an assemblage of agrochemicals for application either by simultaneous or contemporaneous application.

As used herein, the term "simultaneous" when used in connection with application of agrochemicals means that the agrochemicals are applied in an admixture, for example, a tank mix. For simultaneous application, the combination may be the admixture or separate containers each containing an agrochemical that are combined prior to application.

As used herein, the term "contemporaneous" when used in connection with application of agrochemicals means that an individual agrochemical is applied separately from another agrochemical or premixture at the same time or at times sufficiently close together such that at least one benefit from combining the agrochemicals is achieved, for example, if two active components are applied contemporaneously, an activity that is additive or more than additive or synergistic relative to the activity of either active component alone at the same dose is achieved.

As used herein, the term "tank mix" means one or more of the components of the composition of the present invention are mixed in a spray tank at the time of spray application or prior to spray application.

As used herein, the term "effective" when used in connection with an amount of the combination, mixture or composition refers to an amount of the combination, mixture or composition that achieve an agriculturally beneficial level of control and/or prevention of the pest when applied to the locus where the pest is to be controlled and/or prevented.

As used herein, the term "effective amount" refers to an amount of the active component that is commercially recommended for use to control and/or prevent pest. The commercially recommended amount for each active component, often specified as application rates of the commercial formulation, may be found on the label accompanying the commercial formulation. The commercially recommended application rates of the commercial formulation may vary depending on factors such as the plant species and the pest to be controlled.

As used herein, the term "more effective for controlling pest" includes, but is not limited to, increasing efficacy of controlling pest and reducing the amount of time needed to achieve a given level of pest control.

As used herein, the term "more effective for preventing pest" includes, but is not limited to, increasing efficacy of preventing pest infestation and prolonging the duration of protection against pest infestation after application.

As used herein, the term "pest" includes, but is not limited to, unwanted fungus, unwanted insect, unwanted nematode, and weed.

As used herein, the term "weed" includes any undesired vegetation.

As used herein, the term "pesticide" broadly refers to an agent that can be used to prevent, control and/or kill a pest. The term is understood to include but is not limited to fungicides, insecticides, nematicides, herbicides, acaricides, parasiticides or other control agents. For chemical classes and applications, as well as specific compounds of each class, see "The Pesticide Manual Thirteenth Edition" (British Crop Protection Council, Hampshire, UK, 2003), as well as "The e-Pesticide Manual, Version 3" (British Crop Protection Council, Hampshire, UK, 2003-04), the contents of each of which are incorporated herein by reference in their entirety.

As used herein, the term "locus" includes not only areas where the pest may already be developed, but also areas where pest have yet to emerge, and also to areas under cultivation. Locus includes the plant or crop and propagation material of the plant or crop. Locus also includes the area surrounding the plant or crop and the growing media of the plant or crop, such as soil and crop field.

As used herein the term "plant" or "crop" includes reference to whole plants, plant organs (e.g. leaves, stems, twigs, roots, trunks, limbs, shoots, fruits etc.), plant cells, or plant seeds. This term also encompasses plant crops such as fruits.

As used herein, the term "propagation material" of the plant or crop may include all the generative parts of the plant or crop such as seeds and vegetative plant material such as cuttings and tubers, which can be used for the multiplication of the plant. This includes seeds, tubers, spores, corms, bulbs, rhizomes, sprouts basal shoots, stolons, and buds and other parts of plants, including seedlings and young plants, which are to be transplanted after germination or after emergence from soil.

As used herein the term "ha" refers to hectare.

The term "a" or "an" as used herein includes the singular and the plural, unless specifically stated otherwise. Therefore, the terms "a," "an," or "at least one" is used interchangeably in this application.

Throughout the application, descriptions of various embodiments are described using the term "comprising"; however, it will be understood by one of skill in the art, that in some specific instances, an embodiment can be described using the language "consisting essentially of" or "consisting of."

The term "about" herein specifically includes ±10% from the indicated values in the range. In addition, the endpoints of all ranges directed to the same component or property herein are inclusive of the endpoints, are independently combinable, and include all intermediate points and ranges.

It is understood that where a parameter range is provided, all integers within that range, and tenths thereof, are also provided by the invention as if the integers and tenths thereof are expressly described herein. For example, "0.1% to 70%" includes 0.1%, 0.2%, 0.3%, 0.4%, 0.5% etc. up to 70%.

All publications, patents and patent applications mentioned in this specification are herein incorporated in their entirety by reference into the specification, to the same extent as if each individual publication, patent or patent application was specifically and individually indicated to be incorporated herein by reference.

The following examples illustrate the practice of the present subject matter in some of its embodiments but should not be construed as limiting the scope of the present subject matter. Other embodiments apparent to persons of ordinary skill in the art from consideration of the specification and examples herein that fall within the spirit and scope of the appended claims are part of this invention. The specification, including the examples, is intended to be exemplary only, without limiting the scope and spirit of the invention.

Aspects and embodiments of the present invention will now be described.

The present invention provides a soluble liquid (SL) composition comprising (i) an amount of saflufenacil and (ii) an amount of an organic base.

In some embodiments, the SL composition is stable. In some embodiments, the SL composition has low persistent foam.

In some embodiments, the amount of saflufenacil is dissolved in the organic base.

In some embodiments, the organic base is an amine.

In some embodiments, the amine is a primary amine. In some embodiments, the amine is a secondary amine. In some embodiments, the amine is a cyclic amine. In some embodiments, the cyclic amine is an aromatic amine.

In some embodiments, the primary amine is $R_1$—$NH_2$, wherein R1 is a C1-C6 alkyl group. In some embodiments, the $R_1$ of the primary amine is a C4 alkyl group. In some embodiments, the alkyl is linear. In some embodiments, the alkyl is branched. In some embodiments, the $R_1$ of the primary amine is a butyl group.

In some embodiments, the secondary amine is $R_1$—NH—$R_2$, wherein the $R_1$ and the $R_2$ are each C1-C3 linear alkyl groups. In some embodiments, the $R_1$ and the $R_2$ of the secondary amine are both methyl groups. In some embodiments, the $R_1$ and the $R_2$ of the secondary amine are both ethyl groups. In some embodiments, the $R_1$ and the $R_2$ of the secondary amine are both propyl groups. In some embodiments, the alkyl is substituted with OH group(s). In some embodiments, the $R_1$ and the $R_2$ of the secondary amine are both ethanol groups.

In some embodiments, the amine has a pKa in the range of 4-11. In some embodiments, the amine has a pKa of about 5. In some embodiments, the amine has a pKa in the range of 8-9. In some embodiments, the amine has a pKa in the range of 10-11.

In some embodiments, the amine is selected from the group consisting of pyridine, diethanolamine, dimethylamine in tetrahydrofurane (THF), butylamine, dipropylamine, ethoxylated fatty acid amine, and any combination thereof. In some embodiments, the amine is pyridine. In some embodiments, the amine is diethanolamine. In some embodiments, the amine is dimethylamine in tetrahydrofurane (THF). In some embodiments, the amine is butylamine. In some embodiments, the amine is dipropylamine. In some embodiments, the amine is an ethoxylated fatty acid amine. In some embodiments, the ethoxylated fatty acid amine is an ethoxylated coconut fatty acid amine. In some embodiments, the ethoxylated fatty acid amine is ethoxylated with more than 5 EO. In some embodiments, the ethoxylated fatty acid amine is ethoxylated with more than 10 EO. In some embodiments, the ethoxylated fatty acid amine is ethoxylated with 15 EO or more.

In some embodiments, the amine is Genamin® C 200, sold by Clariant. In some embodiments, the amine is Genamin® C 150, sold by Clariant. In some embodiments, the amine is Genamin® C 100, sold by Clariant. In some embodiments, the amine is Genamin® C 050, sold by Clariant. In some embodiments, the amine is Genamin® C 020, sold by Clariant. In some embodiments, the amine other than Genamin® C 050, sold by Clariant.

In some embodiments, the amine has the following structure:

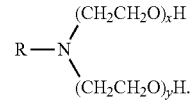

In some embodiments, the amine is other than aniline, triisopropanolamine, monoethanolamine, triethylamine, diisopropylamine, or dibutylamine.

In one embodiment, the present invention provides a soluble liquid (SL) composition comprising (i) an amount of saflufenacil and (ii) an amount of an organic base, wherein the organic base is an amine selected from the group consisting of pyridine, diethanolamine, dimethylamine in tetrahydrofurane (THF), butylamine, dipropylamine, ethoxylated fatty acid amine, and any combination thereof.

In some embodiments, the amount of saflufenacil in the SL composition is from about 0.1% to about 70% by weight, based on the total weight on the composition. In some embodiments, the amount of saflufenacil in the SL composition is from 0.1% to 70% by weight, based on the total weight on the composition. In some embodiments, the amount of saflufenacil in the SL composition is from about 1% to about 30% by weight, based on the total weight on the composition. In some embodiments, the amount of saflufenacil in the SL composition is from about 10% to about 20% by weight, based on the total weight on the composition. In some embodiments, the amount of saflufenacil in the SL composition is about 15% by weight, based on the total weight on the composition. In some embodiments, the amount of saflufenacil in the SL composition is about 16% by weight, based on the total weight on the composition. In some embodiments, the amount of saflufenacil in the SL composition is 15.38% by weight, based on the total weight on the composition. In some embodiments, the amount of saflufenacil in the SL composition is from about 1% to about 10% by weight, based on the total weight on the composition. In some embodiments, the amount of saflufenacil in the SL composition is from about 1% to about 5% by weight, based on the total weight on the composition. In some embodiments, the amount of saflufenacil in the SL composition is about 3% by weight, based on the total weight on the composition.

In some embodiments, the amount of saflufenacil in the SL composition is at least 7% by weight based on the total weight of the composition. In some embodiments, the amount of saflufenacil in the SL composition is greater than 7% by weight based on the total weight of the composition. In some embodiments, the amount of saflufenacil in the SL composition is greater than 10% by weight based on the total weight of the composition. In some embodiments, the amount of saflufenacil in the SL composition is greater than 15% by weight based on the total weight of the composition. In some embodiments, the SL composition is a high load composition.

In some embodiments, the amount of saflufenacil in the SL composition is less than 60% by weight based on the total weight of the composition. In some embodiments, the amount of saflufenacil in the SL composition is less than 30% by weight based on the total weight of the composition. In some embodiments, the amount of saflufenacil in the SL composition is less than 15% by weight based on the total weight of the composition.

In some embodiments, the amount of saflufenacil in the SL composition described herein refer to the amount of saflufenacil dissolved in the organic based of the SL composition.

In some embodiments, the amount of the organic base in the SL composition is from about 0.1% to about 80% by weight, based on the total weight on the composition. In some embodiments, the amount of the organic base in the SL composition is from about 40% to about 80% by weight, based on the total weight on the composition. In some embodiments, the amount of the organic base in the SL composition is from about 50% to about 70% by weight, based on the total weight on the composition. In some embodiments, the amount of the organic base in the SL composition is from about 60% to about 65% by weight, based on the total weight on the composition. In some embodiments, the amount of the organic base in the SL composition is about 61% by weight, based on the total weight on the composition. In some embodiments, the amount of the organic base in the SL composition is about 62% by weight, based on the total weight on the composition. In some embodiments, the amount of the organic base in the SL composition is 61.54% by weight, based on the total weight on the composition. In some embodiments, the amount of the organic base in the SL composition is about 10% to about 15% by weight, based on the total weight on the composition. In some embodiments, the amount of the organic base in the SL composition is 13% by weight, based on the total weight on the composition.

In some embodiments, the saflufenacil and the organic base in the composition has a ratio where the ratio of amine groups to saflufenacil molecule is at least 1:1.

In some embodiments, the SL composition comprises an amount of at least one agriculturally acceptable carrier. In some embodiments, the agriculturally acceptable carrier is water soluble. In some embodiments, the SL composition comprises at least one water soluble agriculturally acceptable carrier. In some embodiments, the agriculturally acceptable carrier is a solvent or co-solvent. In some embodiments, the agriculturally acceptable carrier is dimethylamide ester. In some embodiments, the agriculturally acceptable carrier is Rhodiasolv® PolarClean, sold by Solvay.

In some embodiments, the agriculturally acceptable carrier is

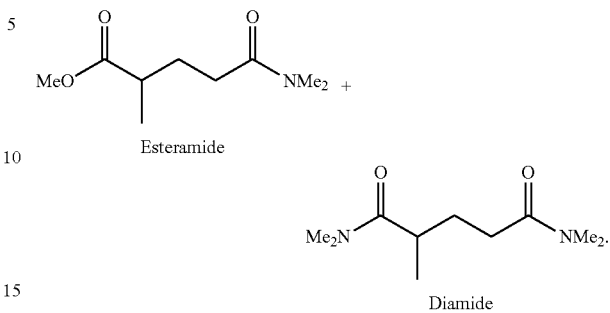

Examples of suitable agriculturally acceptable carriers to be used in the composition may include aromatic hydrocarbons such as alkylbenzenes and alkylnaphthalenes, alcohols such as methanol, cyclohexanol and decanol, ethylene glycol, polypropylene glycol and dipropylene glycol, N,N-dimethylformamide, dimethylamide ester (e.g. Rhodiasolv® PolarClean), dimethylsulfoxide, N-alkylpyrrolidone, paraffins, oils of olive, castor, linseed, tung, sesame, corn, peanut, cotton-seed, soybean, rape-seed and coconut, fatty acid esters, ketones such as cyclohexanone, 2-heptanone, isophorone and 4-hydroxy-4-methyl-2-pentanone and the like.

In some embodiments, the amount of the agriculturally acceptable carrier in the SL composition is from about 0.1% to about 90% by weight, based on the total weight on the composition. In some embodiments, the amount of the agriculturally acceptable carrier in the SL composition is from about 1% to about 40% by weight, based on the total weight on the composition. In some embodiments, the amount of the agriculturally acceptable carrier in the SL composition is from about 10% to about 30% by weight, based on the total weight on the composition. In some embodiments, the amount of the agriculturally acceptable carrier in the SL composition is from about 20% to about 25% by weight, based on the total weight on the composition. In some embodiments, the amount of the agriculturally acceptable carrier in the SL composition is about 23% by weight, based on the total weight on the composition. In some embodiments, the amount of the agriculturally acceptable carrier in the SL composition is 23.08% by weight, based on the total weight on the composition. In some embodiments, the amount of the agriculturally acceptable carrier in the SL composition is from about 1% to about 10% by weight, based on the total weight on the composition. In some embodiments, the amount of the agriculturally acceptable carrier in the SL composition is about 8% by weight, based on the total weight on the composition. In some embodiments, the amount of the agriculturally acceptable carrier in the SL composition is 7.8% by weight, based on the total weight on the composition.

In some embodiments, the SL composition does not comprise an agriculturally acceptable carrier.

In some embodiments, the SL composition comprises an amount of at least one additive.

In some embodiments, the additive is selected from the group consisting of adjuvants, surfactants, emulsifiers, antifreeze agents, anti-foam agents, preservatives, and any combination thereof.

Other ingredients, such as wetting agents, adhesives, neutralizers, thickeners, binders, sequestrants, stabilizers, solubilizer, salts, and/or fertilizers, may also be added to the disclosed compositions.

In some embodiments, the additive is an emulsifier. In some embodiments, the emulsifier is PEG-36 castor oil. In some embodiments, the emulsifier is Emulsogen EL 360, sold by Clariant.

In some embodiments, the additive is a surfactant.

Examples of suitable surfactants include non-ionic, anionic, cationic and ampholytic types such as alkoxylated fatty alcohols, ethoxylated fatty acid amines, ethoxylated polysorbate (e.g. tween 20), ethoxylated castor oil, lignin sulfonates, fatty acid sulfonates (e.g. lauryl sulfonate), phosphate esters such as phosphate esters of alcohol alkoxylates, phosphate esters of alkylphenol alkoxylates and phosphate esters of styrylphenol ethoxylates, condensates of sulfonated naphthalene and naphthalene derivatives with formaldehyde, condensates of naphthalene or of naphthalenesulfonic acid with phenol and formaldehyde, alkylarylsulfonates, ethoxylated alkylphenols and aryl phenols, polyalkylene glycols and sorbitol esters.

In some embodiments, the additive is a non-ionic surfactant. In some embodiments, the surfactant is calcium alkyl benzene sulfonate. In some embodiments, the surfactant is NANSA® EVM 70-2E, sold by Huntsman.

In some embodiments, the amount of additive(s) in the SL composition is from about 1% to about 80% by weight, based on the total weight of the composition. In some embodiments, the amount of additive(s) in the SL composition is from about 1% to about 50% by weight, based on the total weight of the composition. In some embodiments, the amount of additive(s) in the SL composition is from about 1% to about 30% by weight, based on the total weight of the composition. In some embodiments, the amount of additive(s) in the SL composition is from about 1% to about 10% by weight, based on the total weight of the composition. In some embodiments, the amount of additive(s) in the SL composition is from about 5% to about 10% by weight, based on the total weight of the composition. In some embodiments, the amount of additive(s) in the SL composition is about 6% by weight, based on the total weight of the composition. In some embodiments, the amount of additive(s) in the SL composition is 6.2% by weight, based on the total weight of the composition.

In some embodiments, the amount of emulsifier in the SL composition is from about 1% to about 10% by weight, based on the total weight of the composition. In some embodiments, the amount of emulsifier in the SL composition is from about 1% to about 5% by weight, based on the total weight of the composition. In some embodiments, the amount of emulsifier in the SL composition is about 4% by weight, based on the total weight of the composition. In some embodiments, the amount of emulsifier in the SL composition is 3.7% by weight, based on the total weight of the composition.

In some embodiments, the amount of surfactant in the SL composition is from about 1% to about 10% by weight, based on the total weight of the composition. In some embodiments, the amount of surfactant in the SL composition is from about 1% to about 5% by weight, based on the total weight of the composition. In some embodiments, the amount of surfactant in the SL composition is about 2.5% by weight, based on the total weight of the composition.

In some embodiments, the SL composition comprises an amount of at least one additional pesticide.

In some embodiments, the additional pesticide is an herbicide. In some embodiments, the herbicide is selected from the group consisting of 2,4-D, imazethapyr, pyroxasulfone, S-metolachlor, glufosinate, halauxifen, glyphosate, carfentrazone, sulfentrazone, dimethenamide-P, mesotrione, metribuzin and bicycopyrone. In some embodiments, the herbicide is 2,4-D.

In some embodiments, the amount of the additional pesticide in the SL composition is from about 1% to about 80% by weight, based on the total weight of the composition. In some embodiments, the amount of the additional pesticide in the SL composition is from about 60% to about 80% by weight, based on the total weight of the composition. In some embodiments, the amount of the additional pesticide in the SL composition is about 70% by weight, based on the total weight of the composition.

In some embodiments, the composition comprising the additional pesticide is more effective for controlling and/or preventing pest than when each pesticide at the same amount is applied alone.

In some embodiments, the amount of saflufenacil and the amount of the additional pesticide(s) in the composition when applied together is more effective for controlling and/or preventing pest than when each pesticide at the same amount is applied alone.

In some embodiments, the amount of saflufenacil in the composition is less than the pesticidally effective amount of saflufenacil when saflufenacil is used alone. In some embodiments, the amount of the additional pesticide(s) in the composition is less than the pesticidally effective amount of the additional pesticide(s) when the additional pesticide(s) is used alone.

In some embodiments, the pest is weed.

The subject invention also provides a soluble liquid composition comprising (i) an amount of saflufenacil, (ii) an amount of 2,4-D, and (iii) an amount of on organic base.

In some embodiments, the SL composition comprises:
  (i) about 15% by weight of saflufenacil, based on the total weight of the
  (ii) about 62% by weight of an amine, based on the total weight of the composition, and
  (iii) about 23% by weight of an agriculturally acceptable carrier, based on the total weight of the composition.

In some embodiments, the SL composition comprises:
  (i) about 15% by weight of saflufenacil, based on the total weight of the composition,
  (ii) about 62% by weight of Genamine® C 150, based on the total weight of the composition, and
  (iii) about 23% by weight of Rhodiasolv® PolarClean, based on the total weight of the composition.

In some embodiments, the SL composition comprises:
  (i) 15.38% by weight of saflufenacil, based on the total weight of the composition,
  (ii) 61.54% by weight of Genamine® C 150, based on the total weight of the composition, and
  (iii) 23.08% by weight of Rhodiasolv® PolarClean, based on the total weight of the composition.

In some embodiments, the SL composition comprises:
  (i) about 15% by weight of saflufenacil, based on the total weight of the composition,
  (ii) about 62% by weight of diethanolamine, based on the total weight of the composition, and
  (iii) about 23% by weight of Rhodiasolv® PolarClean, based on the total weight of the composition.

In some embodiments, the SL composition comprises:
  (i) 15.38% by weight of saflufenacil, based on the total weight of the composition,
  (ii) 61.54% by weight of diethanolamine, based on the total weight of the composition, and
  (iii) 23.08% by weight of Rhodiasolv® PolarClean, based on the total weight of the composition.

In some embodiments, the SL composition comprises:
(i) about 3% by weight of saflufenacil, based on the total weight of the composition,
(ii) about 70% by weight of 2,4-D, based on the total weight of the composition,
(iii) about 13% by weight of an amine, based on the total weight of the composition,
(iv) about 4% by weight of an emulsifier, based on the total weight of the composition,
(v) about 2.5% by weight of a surfactant, based on the total weight of the composition, and
(vi) about 8% by weight of an agriculturally acceptable carrier, based on the total weight of the composition.

In some embodiments, the SL composition comprises:
(i) about 3% by weight of saflufenacil, based on the total weight of the composition,
(ii) about 70% by weight of 2,4-D, based on the total weight of the composition,
(iii) about 13% by weight of Genamin® C 050, based on the total weight of the composition,
(iv) about 4% by weight of Emulsogen EL 360, based on the total weight of the composition,
(v) about 2.5% by weight of NANSA® EVM 70-2E, based on the total weight of the composition, and
(vi) about 8% by weight of Rhodiasolv® PolarClean, based on the total weight of the composition.

In some embodiments, the SL composition comprises:
(i) 3% by weight of saflufenacil, based on the total weight of the composition,
(ii) 70% by weight of 2,4-D, based on the total weight of the composition,
(iii) 13% by weight of Genamin® C 050, based on the total weight of the composition,
(iv) 3.7% by weight of Emulsogen EL 360, based on the total weight of the composition,
(v) 2.5% by weight of NANSA® EVM 70-2E, based on the total weight of the composition, and
(vi) 7.8% by weight of Rhodiasolv® PolarClean, based on the total weight of the composition.

In some embodiments, the SL composition is non-aqueous. In some embodiments, the SL composition is substantially water-free. In some embodiments, the SL composition is water-free.

As will be readily appreciated, any material to which the disclosed compositions can be added may be used, provided they yield the desired utility without significant interference with the activity of these compositions, including synergistic compositions, as herbicidal agents.

The disclosed compositions may optionally include combinations that can comprise at least 1% by weight of one or more of the compositions with another pesticidal compound. Such additional pesticidal compounds may be herbicides, fungicides, insecticides, nematocides, miticides, arthropodicides, bactericides or combinations thereof that are compatible with the synergistic compositions of the present disclosure in the medium selected for application, and not antagonistic to the activity of the present compounds. Accordingly, in such embodiments the other pesticidal compound is employed as a supplemental toxicant for the same or for a different pesticidal use. The pesticidal compound and the synergistic composition can generally be mixed together in a weight ratio of from 1:100 to 100:1.

The present invention also provides a combination comprising:
(i) an amount of saflufenacil, and
(ii) an amount of an organic base.

The present invention also provides a combination comprising:
(i) an amount of any one of the SL compositions disclosed herein, and
(ii) an amount of at least one additional pesticide.

In some embodiments, the combination is more effective for controlling and/or preventing pest than when each pesticide at the same amount is applied alone.

In some embodiments, the amount of saflufenacil and the amount of the additional pesticide(s) when applied together is more effective for controlling and/or preventing pest than when each pesticide at the same amount is applied alone.

In some embodiments, the amount of saflufenacil in the combination is less than the pesticidally effective amount of saflufenacil when saflufenacil is used alone, and/or the amount of the additional pesticide(s) in the combination is less than the pesticidally effective amount of the additional pesticide(s) when the additional pesticide(s) is used alone.

In some embodiments, the additional pesticide is an herbicide. In some embodiments, the herbicide is selected from the group consisting of 2,4-D, imazethapyr, pyroxasulfone, S-metolachlor, glufosinate, halauxifen, glyphosate, carfentrazone, sulfentrazone, dimethenamide-P, mesotrione, metribuzin and bicycopyrone.

In some embodiments, the saflufenacil and the additional pesticide are synergistic. Synergism occurs when the effect of two or more compounds exceeds the effect of the compounds when used alone.

The subject invention also provides a mixture comprising any one of the combinations disclosed herein.

The subject invention also provides a mixture comprising any one of the SL compositions disclosed herein.

The subject invention also provides a mixture comprising any one of the SL compositions disclosed herein and an amount of at least one additional pesticide.

In some embodiments, the additional pesticide is an herbicide. In some embodiments, the herbicide is selected from the group consisting of 2,4-D, imazethapyr, pyroxasulfone, S-metolachlor, glufosinate, halauxifen, glyphosate, carfentrazone, sulfentrazone, dimethenamide-P, mesotrione, metribuzin and bicycopyrone. In some embodiments, the herbicide is 2,4-D.

In some embodiments, the mixture is a tank mix.

In some embodiments, the mixture is more effective for controlling and/or preventing pest than when each pesticide at the same amount is applied alone.

In some embodiments, the amount of saflufenacil and the amount of the additional pesticide(s) in the mixture when applied together is more effective for controlling and/or preventing pest than when each pesticide at the same amount is applied alone.

In some embodiments, the amount of saflufenacil in the mixture is less than the pesticidally effective amount of saflufenacil when saflufenacil is used alone. In some embodiments, the amount of the additional pesticide(s) in the mixture is less than the pesticidally effective amount of the additional pesticide(s) when the additional pesticide(s) is used alone.

In some embodiments, the pest is weed.

The present invention also provides a SL composition comprising any one of the combinations disclosed herein.

The present invention also provides a SL composition comprising any one of the mixtures disclosed herein.

The present invention also provides a method of controlling and/or preventing pests comprising applying an effective amount of any one of the SL compositions, mixtures or combinations disclosed herein, to a locus where the pest is to be controlled and/or prevented so as to thereby control and/or prevent the pest.

In some embodiments, the pest is weed.

In some embodiments, the locus where the pest is to be controlled and/or prevented is a crop field.

The present invention also provides a method for controlling weed comprising applying an effective amount of any one of the SL compositions, mixtures or combinations disclosed herein to a locus where the weed is to be controlled so as to thereby control the weed.

The present invention also provides a method of controlling weed in a field of crop comprising applying an effective amount of any one of the SL compositions, mixtures or combinations disclosed herein to the field of crop so as to thereby control the weed in the field of crop.

In some embodiments, the crop is selected from the group consisting of cotton, rice, banana, potato, coffee, sugar cane, citrus, beans, sunflower, apple, corn, soybean, wheat, barley, oats, chickpeas, fruit trees, nut trees, and grain sorghum.

In some embodiments, the SL composition is diluted with water prior to application.

In some embodiments, the locus where the weed is to be controlled is a crop field.

The weeds may be selected from the group consisting of: *Hibiscus trionum, Lolium perenne L.* ssp. *multiflorum* (*Lam.*) *Husnot, Sida rhombifolia L., Anoda cristata* (*L.*) *Schlecht., Lamium* spp. *L., Cyperus difformis L., Croton sperrsifeorus, Nicandra physalodes, Chenopodium album L., Echinochloa colona, Amaranthus viridis, Hordeum murinum* subsp. *Leporinum, Sisymbrium orientale, Ipomoea plebeia, Cerastium vulgatum, Bifora radians Bieb., Echinochloa crus-galli* (*L.*) *Beauv., Digera* spp., *Digera arvensis, Arctotheca calendula* (*L.*) *Levyns., Cynadon dactylone, Commelina benghalensis L., Eragrostis pilosa* (*L.*) *Beauv., Amaranthus retrollexus L., Amaranthus* sp., *Euphorbia hirta L., Datura wrightii Regel, Capsella bursa pastoris* (*L.*) *Medik., Emex australis, Urtica dioica L., Veronica hederifolia L., Erodium cicutarium, Juncus tenuis Willd., Juncus bufonius, Lythrum hyssopifolia, Rapistrum rugosum* (*L.*) *All., Salvia reflexa, Buglossoides arvensis syn Lithospermum arvens, Xanthium pungens, Ribes divaricatum, Ribes nigrum, Cyperus rotundus, Raphanus raphanistrum L., Echium plantagineum, Polygonumaviculare and Polygonum arenastrum, Parthenium, Lactuca serriola L., Acanthospermum, Galium tricornutum Dandy, Amsinckia calycina* (*Moris*) *Chater, Amsinckia intermedia Fischer & C.Meyer, Amsinckia lycopsoides* (*Lehm.*) *Lehm., Triticum* sp., *Hordeum vulgare, Alopecurus myosuroides Huds., Lolium* sp., *Elymus repens, Bromus sterilis, Xanthium Spinosum, Datura ferox, Dinebra Arabica, Eleusine indica, Cynodon dactylon, Euphorbia Hirta, Trianthema Portulacasturm, Amaranthus deflexus, Amaranthus hybridus L., Polygonum, Persicaria maculosa, Synapis arvensis, Abutilon theophrasti Medik., Ambrosia artemisiifolia L., Solanum ptychanthum, Solanum nigrum, Xanthium strumarium L., Polygonum convolvulus, Alopecurus* sp., *Bromus madritensis* sp., *Panicum* sp., *Hordeum jubatum* sp., *Setaria* sp., *Panicum capillare L., Panicum miliaceum L., Digitaria* sp., *Cyperus esculentus L., Acanthospermum hispidum DC, Cynotis* sp, *Tradescantia fluminernsis, Galinsoga* sp., *Portulaca oleracea L., Alternanthera caracasana, Tribulus zeyheri, Acanthospermum australe, Acanthospermum glabratum, Cleome monophylla, Phyllanthus* sp., *Flaveria bidentis, Galinsoga parvijlora, Soliva sessilis, Bidens pilosa, Parnassia palustris, Eragrostis, Ipomeas* sp., *Hierochloe odorata, Anthoxanthum nitens, Rottboellia cochinchinensis L., Schkuhria Bonariensi L., Sorghum halepense, Devil thorn, Zea mays L, Cleome viscosa, Parthenium hysterophorus, Commelina bengalensis, Dinebra* sp., *Portulaca* sp., *Trianthima* sp., *Dactyloctenium aegyptium, Corchprus* sp., *Trianthema monogyna* and *Brachiaria* sp.

In some embodiments, the weed is *Chenopodium album*. In some embodiments, the weed is *Xanthium strumarium L.* In some embodiments, the weed is *Solanum nigrum*.

The present invention provides a method, wherein it is used on a crop field, wherein the crops are selected from a group comprising: *Allium cepa, Ananas comosus, Arachis hypogaea, Asparagus officinalis, Beta vulgaris* spec. *altissima, Beta vulgaris* spec. *rapa, Brassica napus* var. *napus, Brassica napus* var. *napobrassica, Brassica rapa* var. *silvestris, Camellia sinensis, Carthamus tinctorius, Carya illinoinensis, Citrus limon, Citrus sinensis, Coffea arabica* (*Coffea canephora, Coffea liberica*), *Cucumis sativus, Cynodon dactylon, Daucus carota, Elaeis guineensis, Fragaria vesca, Glycine max, Gossypium hirsutum,* (*Gossypium arboreum, Gossypium herbaceum, Gossypium vitifolium*), *Helianthus annuus, Hevea brasiliensis, Hordeum vulgare, Humulus lupulus, Ipomoea batatas, Juglans regia, Lens culinaris, Linum usitatissimum, Lycopersicon lycopersicum, Malus* spec., *Manihot esculenta, Medicago sativa, Musa* spec., *Nicotiana tabacum* (*N. rustica*), *Olea europaea, Oryza sativa, Phaseolus lunatus, Phaseolus vulgaris, Picea abies, Pinus* spec., *Pisum sativum, Prunus armeniaca, Prunus avium, Prunus cerasus, Prunus dulcis, Prunus domesticua, Prunus persica, Pyrus communis, Ribes sylvestre, Ricinus communis, Saccharum officinarum, Secale cereale, Solanum tuberosum, Sorghum bicolor* (*S. vulgare*), *Theobroma cacao, Trifolium pratense, Triticum aestivum, Triticum durum, Vicia faba, Vitis vinifera* and *Zea mays*.

In some embodiments, the crop is selected from the group consisting of cotton, rice, banana, potato, coffee, sugar cane, citrus, beans, sunflower, apple, corn, soybean, wheat, barley, oats, chickpeas, fruit trees, nut trees, and grain sorghum.

In some embodiments, the SL composition is applied to pasture. In some embodiments, the SL composition is applied to non-crop areas. In some embodiments, the SL composition is applied to fallow.

In some embodiments, the SL composition is applied as pre-harvest aid.

In some embodiments, the SL composition is applied pre-plant incorporated. In some embodiments, the SL composition is applied post-emergence. In some embodiments, the SL composition is applied pre-emergence.

In some embodiments, the mixture or combination is applied to pasture. In some embodiments, the mixture or combination is applied to non-crop areas. In some embodiments, the mixture or combination is applied to fallow.

In some embodiments, the mixture or combination is applied as pre-harvest aid.

In some embodiments, the mixture or combination is applied pre-plant incorporated. In some embodiments, the mixture or combination is applied post-emergence. In some embodiments, the mixture or combination is applied pre-emergence.

In some embodiments, the SL composition is applied at an amount from about 0.001 L/ha to about 0.2 L/ha. In some embodiments, the SL composition is applied at an amount from about 0.001 L/ha to about 0.1 L/ha. In some embodiments, the SL composition is applied at an amount from about 0.001 L/ha to about 0.05 L/ha. In some embodiments, the SL composition is applied at an amount of about 0.006 L/ha. In some embodiments, the SL composition is applied at an amount of about 0.01 L/ha. In some embodiments, the SL composition is applied at an amount of about 0.02 L/ha. In some embodiments, the SL composition is applied at an amount of about 0.03 L/ha. In some embodiments, the SL composition is applied at an amount of about 0.04 L/ha. In some embodiments, the SL composition is applied at an amount of about 0.05 L/ha.

In some embodiments, the mixture or combination is applied at an amount from about 0.001 L/ha to about 0.2 L/ha. In some embodiments, the mixture or combination is applied at an amount from about 0.001 L/ha to about 0.1 L/ha. In some embodiments, the mixture or combination is applied at an amount from about 0.001 L/ha to about 0.05 L/ha. In some embodiments, the mixture or combination is applied at an amount of about 0.006 L/ha. In some embodiments, the mixture or combination is applied at an amount of about 0.01 L/ha. In some embodiments, the mixture or combination is applied at an amount of about 0.02 L/ha. In some embodiments, the mixture or combination is applied at an amount of about 0.03 L/ha. In some embodiments, the mixture or combination is applied at an amount of about 0.04 L/ha. In some embodiments, the mixture or combination is applied at an amount of about 0.05 L/ha.

In some embodiments, the SL composition is applied at an amount from about 0.01 g/ha of saflufenacil to about 15 g/ha of saflufenacil. In some embodiments, the SL composition is applied at an amount from about 0.5 g/ha of saflufenacil to about 10 g/ha of saflufenacil. In some embodiments, the SL composition is applied at an amount from about 0.5 g/ha of saflufenacil to about 10 g/ha of saflufenacil. In some embodiments, the SL composition is applied at an amount from about 0.5 g/ha of saflufenacil to about 5 g/ha of saflufenacil. In some embodiments, the SL composition is applied at an amount from about 5 g/ha of saflufenacil to about 10 g/ha of saflufenacil. In some embodiments, the SL composition is applied at an amount from about 0.5 g/ha of saflufenacil to about 2 g/ha of saflufenacil. In some embodiments, the SL composition is applied at an amount from about 3 g/ha of saflufenacil to about 5 g/ha of saflufenacil. In some embodiments, the SL composition is applied at an amount from about 7 g/ha of saflufenacil to about 9 g/ha of saflufenacil. In some embodiments, the SL composition is applied at an amount of about 1 g/ha of saflufenacil. In some embodiments, the SL composition is applied at an amount of about 2 g/ha of saflufenacil. In some embodiments, the SL composition is applied at an amount of about 4 g/ha of saflufenacil. In some embodiments, the SL composition is applied at an amount of about 8 g/ha of saflufenacil. In some embodiments, the SL composition is applied at an amount of 0.96 g/ha of saflufenacil, 1.060 g/ha of saflufenacil, 1.796 g/ha of saflufenacil, 4.19 g/ha of saflufenacil, or 8.38 g/ha of saflufenacil.

In some embodiments, the mixture or combination is applied at an amount from about 0.01 g/ha of saflufenacil to about 15 g/ha of saflufenacil. In some embodiments, the mixture or combination is applied at an amount from about 0.5 g/ha of saflufenacil to about 10 g/ha of saflufenacil. In some embodiments, the mixture or combination is applied at an amount from about 0.5 g/ha of saflufenacil to about 10 g/ha of saflufenacil. In some embodiments, the mixture or combination is applied at an amount from about 0.5 g/ha of saflufenacil to about 5 g/ha of saflufenacil. In some embodiments, the mixture or combination is applied at an amount from about 5 g/ha of saflufenacil to about 10 g/ha of saflufenacil. In some embodiments, mixture or combination is applied at an amount from about 0.5 g/ha of saflufenacil to about 2 g/ha of saflufenacil. In some embodiments, the mixture or combination is applied at an amount from about 3 g/ha of saflufenacil to about 5 g/ha of saflufenacil. In some embodiments, the mixture or combination is applied at an amount from about 7 g/ha of saflufenacil to about 9 g/ha of saflufenacil. In some embodiments, the mixture or combination is applied at an amount of about 1 g/ha of saflufenacil. In some embodiments, the mixture or combination is applied at an amount of about 2 g/ha of saflufenacil. In some embodiments, the mixture or combination is applied at an amount of about 4 g/ha of saflufenacil. In some embodiments, the mixture or combination is applied at an amount of about 8 g/ha of saflufenacil. In some embodiments, the mixture or combination is applied at an amount of 0.96 g/ha of saflufenacil, 1.060 g/ha of saflufenacil, 1.796 g/ha of saflufenacil, 4.19 g/ha of saflufenacil, or 8.38 g/ha of saflufenacil.

In some embodiments, the method comprises applying at least one additional pesticide.

In some embodiments, the additional pesticide is an herbicide. In some embodiments, the herbicide is selected from the group consisting of 2,4-D, imazethapyr, pyroxasulfone, S-metolachlor, glufosinate, halauxifen, glyphosate, carfentrazone, sulfentrazone, dimethenamide-P, mesotrione, metribuzin and bicyclopyrone.

In some embodiments, the saflufenacil and the additional pesticide(s) are applied simultaneously. In some embodiments, the saflufenacil and the additional pesticide(s) are applied concurrently. In some embodiments, the additional pesticide(s) is applied with the saflufenacil. In some embodiments, the additional pesticide(s) is applied at the same time as the saflufenacil. In some embodiments, the saflufenacil and the additional pesticide(s) are applied sequentially.

The present invention also provides use of any one of the SL compositions, combinations or mixtures disclosed herein for controlling and/or preventing pests comprising applying any one of the SL compositions, combinations or mixtures disclosed herein, to a locus where the pest is to be controlled and/or prevented.

In some embodiments, the pest is weed.

The present invention also provides use of any one of the SL compositions, combinations or mixtures disclosed herein for controlling weed comprising applying an effective amount of any one of the SL compositions, combinations or mixtures disclosed herein to a locus where the weed is to be controlled.

The present invention also provides the SL compositions, combinations or mixtures disclosed herein for use in controlling and/or preventing pests comprising applying any one of the SL compositions, combinations or mixtures disclosed herein, to a locus where the pest is to be controlled and/or prevented.

In some embodiments, the pest is weed.

The present invention also provides the SL compositions, combinations or mixtures disclosed herein for use in controlling weeds comprising applying an effective amount of any one of the SL compositions, combinations or mixtures disclosed herein to a locus where the weed is to be controlled.

The present invention also provides a package comprising any one of the SL compositions, combinations or mixtures disclosed herein.

The present invention provides a use of an amine salt of saflufenacil for preparing a soluble liquid (SL) composition.

In some embodiment, the SL composition is any one of the SL compositions disclosed herein.

The present invention provides an amine salt of saflufenacil for use in preparing a soluble liquid composition.

In some embodiment, the SL composition is any one of the SL compositions disclosed herein.

One possibility is the formation of a complex based on electrostatic forces, between the active ingredient, e.g. saflufenacil and the organic base, e.g. amine. The creation of such complex is possible, probably due to the negative-charged-nature of the organic base and the positive-charged-nature of saflufenacil, which is a week acid chemical, along with stereochemical properties of saflufenacil.

The subject invention also provides a process for preparing the SL compositions disclosed herein, wherein the process comprises:

(i) obtaining the amount of saflufenacil and the amount of the organic base, (ii) mixing the saflufenacil and the organic base obtained in step (i) to obtain the SL composition.

In some embodiments, step (i) further comprises obtaining the amount of the agriculturally acceptable carrier and step (ii) comprises mixing the saflufenacil, the organic carrier and the agriculturally acceptable carrier obtained in step (i) to obtain the SL composition.

In some embodiments, the mixing of step (ii) is performed until a homogeneous mixture is obtained.

In some embodiments, step (ii) comprises heating the mixture of saflufenacil and the organic base.

In yet another embodiment, the product of any of the disclosed processes can be isolated from the reaction mixture by any conventional techniques well-known in the art. Such isolation techniques can include, without limitation, one or more of the following: concentration, extraction, precipitation, cooling, filtration, crystallization, and centrifugation, followed by drying.

In yet another embodiment, the product of any of the disclosed processes can be optionally purified by any conventional techniques well-known in the art. Such purification techniques may include, without limitation, one or more of the following: precipitation, crystallization, slurrying, washing in a suitable solvent, filtration through a packed-bed column, dissolution in an appropriate solvent, and re-precipitation by addition of a second solvent in which the compound is insoluble, or any combination thereof.

Each embodiment disclosed herein is contemplated as being applicable to each of the other disclosed embodiments. Thus, all combinations of the various elements described herein are within the scope of the invention. In addition, the elements recited in composition embodiments can be used in the combination, mixture, method, use, package and process embodiments described herein and vice versa.

This invention will be better understood by reference to the Examples which follow, but those skilled in the art will readily appreciate that the specific experiments detailed are only illustrative of the invention as described more fully in the claims which follow thereafter.

The invention is illustrated by the following examples without limiting it thereby.

EXAMPLES

Example 1

Saflufenacil SL Formulation: Saflufenacil with Genamine® C 150 Dissolved in Rhodiasolv® PolarClean

TABLE 1

| Component | % by weight |
|---|---|
| Saflufenacil Tech | 15.38 |
| Genamine ® C 150 | 61.54 |
| Rhodiasolv ® PolarClean | 23.08 |

1. The Genamine® C-150 was mixed together with the Rhodiasolv® PolarClean solvent and the saflufenacil.
2. Mixing was continued until homogeneity was reached.

Example 2

Saflufenacil SL Formulation: Saflufenacil with Diethanolamine Dissolved in Rhodiasolv® PolarClean

TABLE 2

| Component | % by weight |
|---|---|
| Saflufenacil Tech | 15.38 |
| Diethanolamine | 61.54 |
| Rhodiasolv ® PolarClean | 23.08 |

1. The diethanolamine was mixed with the Rhodiasolv® PolarClean solvent and the saflufenacil.
2. Mixing was continued until homogeneity was reached.

Example 3

Saflufenacil and 2,4-D SL Formulation Comprising 3% Saflufenacil and 70% 2,4-D 2EH

TABLE 3

| Saflufenacil/2,4-D 3%/70% | % by weight |
|---|---|
| 2,4-D 2EH | 70.00 |
| Saflufenacil | 3.00 |
| Genamin ® C 050 | 13.00 |
| Emulsogen EL 360 | 3.70 |
| NANSA ® EVM 70-2E | 2.50 |
| Rhodiasolv ® PolarClean | 7.80 |

1. The Genamine® C 050 was mixed together with the Rhodiasolv® PolarClean solvent, 2,4-D (acid form) and the saflufenacil.
2. Mixing was continued until homogeneity was reached.
3. The Emulsogen EL 360 (sold by Clariant) and NANSA® EVM 70-2E (sold by Huntsman) were added while mixing.

Example 4

Efficacy of Saflufenacil SL Formulations (Protocol 1)

All seeds were sown in plastic pots (8 cm diameter and 10.5 cm deep) filled with Newe Ya'ar soil (medium-heavy clay-loam soil). Each treatment was performed in 5 repetitions. The spray application was performed using motorized sprayer equipped with a flat fan 8001E nozzle 4 and operated at a pressure of 300 kPa, at 20 L/dunam spray volume. The pots were transferred to a heated greenhouse (35-20° C.) at Newe Ya'ar Research Center in Israel and were sprinkler-irrigated to field capacity four hours after herbicide application. weeds development was visually estimated at scale of 0-100% (0=dead plants, and 100=healthy vigorous plants) once a week and at the end of the trial to examine efficacy and selectivity of the applied herbicides.

The saflufenacil formulations were applied post-emergence. Table 4 below summarizes the application rates of the saflufenacil formulations. Eragon® LQ is a water-based suspension concentrate (SC) formulation sold by BASF (active ingredient: saflufenacil at a concentration of 342 g/L). Saflufenacil 160 SL (B) is the formulation of Example 1. Saflufenacil 160 SL (A) is a formulation similar to the formulation of Example 1, except Genamine® C 150 is replaced with Genamine® C 50.

TABLE 4

| | | Application Rate | |
|---|---|---|---|
| # | Treatment | L/Ha | g AI/Ha |
| 1 | Eragon® LQ (342 g/L) | 0.01 | 4.19 |
| 2 | Eragon® LQ (342 g/L) | 0.02 | 8.38 |
| 3 | Saflufenacil 160 SL (A) | 0.03 | 4.19 |
| 4 | Saflufenacil 160 SL (A) | 0.05 | 8.38 |
| 5 | Saflufenacil 160 SL (B) | 0.03 | 4.19 |
| 6 | Saflufenacil 160 SL (B) | 0.05 | 8.38 |

Example 4a

Efficacy on *Chenopodium Album* in Pots (Post-Emergence)

Saflufenacil formulations were applied on *Chenopodium album* in pots. The efficacy (% control) at 3 days, 7 days and 18 days after spray application (DAA) is shown in Table 5 below.

TABLE 5

| | | Application Rate | | % Control | | |
|---|---|---|---|---|---|---|
| # | Treatment | L/Ha | g AI/Ha | 3 DAA | 7 DAA | 18 DAA |
| 1 | Eragon ® LQ (342 g/L) | 0.01 | 4.19 | 40% | 40% | 15% |
| 2 | Eragon ® LQ (342 g/L) | 0.02 | 8.38 | 65% | 70% | 30% |
| 3 | Saflufenacil 160 SL (A) | 0.03 | 4.19 | 80% | 100% | 90% |
| 4 | Saflufenacil 160 SL (A) | 0.05 | 8.38 | 100% | 100% | 100% |
| 5 | Saflufenacil 160 SL (B) | 0.03 | 4.19 | 100% | 100% | 100% |
| 6 | Saflufenacil 160 SL (B) | 0.05 | 8.38 | 100% | 100% | 100% |

The results are shown in FIG. 1.

Example 4b

Efficacy on *Xanthium Strumarium* in Pots (Post-Emergence)

Saflufenacil formulations were applied on *Xanthium strumarium L.* in pots. The efficacy (% control) at 3 days, 7 days and 18 days after spray application (DAA) is shown in Table 6 below.

TABLE 6

| | | Application Rate | | % Control | | |
|---|---|---|---|---|---|---|
| # | Treatment | L/Ha | g AI/Ha | 3 DAA | 7 DAA | 18 DAA |
| 1 | Eragon ® LQ (342 g/L) | 0.01 | 4.19 | 80% | 90% | 80% |
| 2 | Eragon ® LQ (342 g/L) | 0.02 | 8.38 | 90% | 95% | 90% |
| 3 | Saflufenacil 160 SL (A) | 0.03 | 4.19 | 100% | 100% | 100% |
| 4 | Saflufenacil 160 SL (A) | 0.05 | 8.38 | 100% | 100% | 100% |
| 5 | Saflufenacil 160 SL (B) | 0.03 | 4.19 | 100% | 100% | 100% |
| 6 | Saflufenacil 160 SL (B) | 0.05 | 8.38 | 100% | 100% | 100% |

Figure 2:
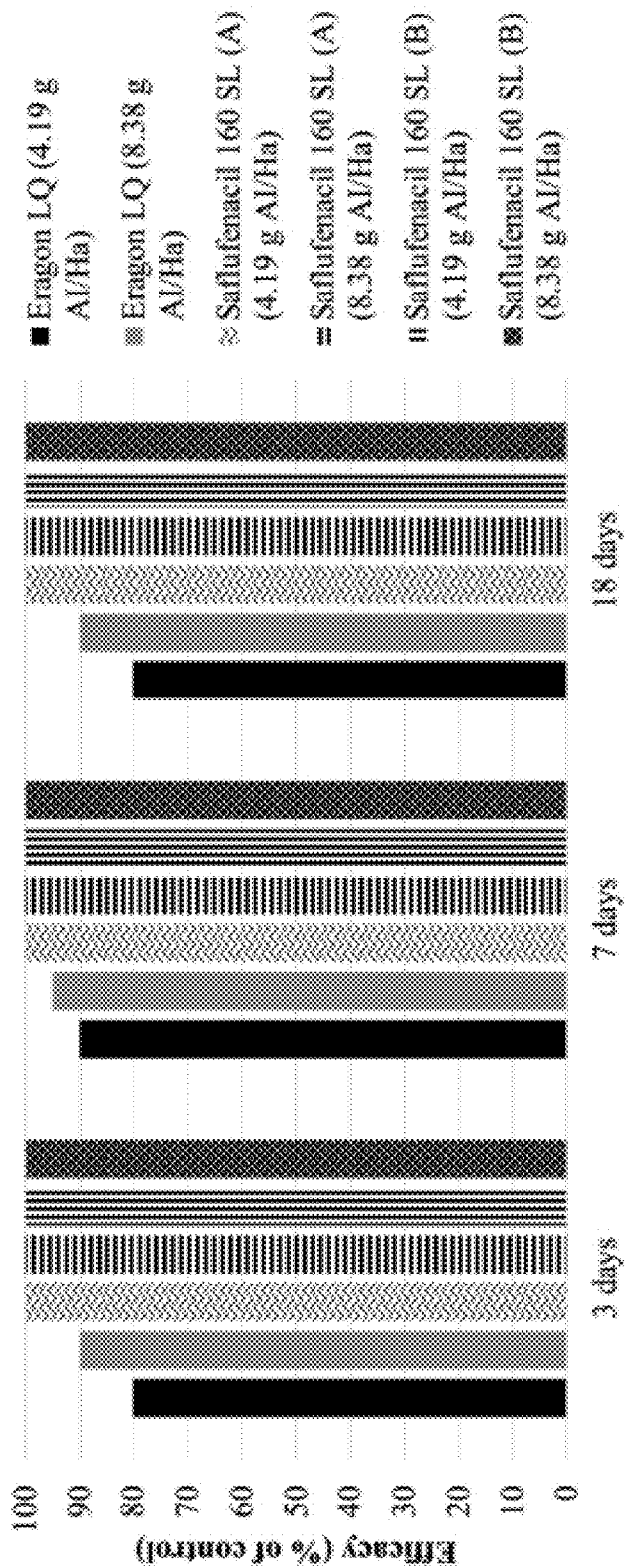
FIG. 2 shows the efficacy of Eragon® LQ, Saflufenacil 160 SL (A) and Saflufenacil 160 SL (B) on *Xanthium strumarium* at 3 days, 7 days and 18 days after post-emergence spray application.

The results are shown in FIG. 2.

Example 4c

Efficacy on *Solanum Nigrum* in Pots (Post-Emergence)

Saflufenacil formulations were applied on *Solanum nigrum* in pots. The efficacy (% control) at 3 days, 7 days, and 18 days after spray application is shown in Table 7 below.

TABLE 7

| | | Application Rate | | % Control | | |
|---|---|---|---|---|---|---|
| # | Treatment | L/Ha | g AI/Ha | 3 DAA | 7 DAA | 18 DAA |
| 1 | Eragon ® LQ (342 g/L) | 0.01 | 4.19 | 95% | 100% | 100% |
| 2 | Eragon ® LQ (342 g/L) | 0.02 | 8.38 | 95% | 100% | 100% |
| 3 | Saflufenacil 160 SL (A) | 0.03 | 4.19 | 100% | 100% | 100% |
| 4 | Saflufenacil 160 SL (A) | 0.05 | 8.38 | 100% | 100% | 100% |
| 5 | Saflufenacil 160 SL (B) | 0.03 | 4.19 | 100% | 100% | 100% |
| 6 | Saflufenacil 160 SL (B) | 0.05 | 8.38 | 100% | 100% | 100% |

Figure 3:
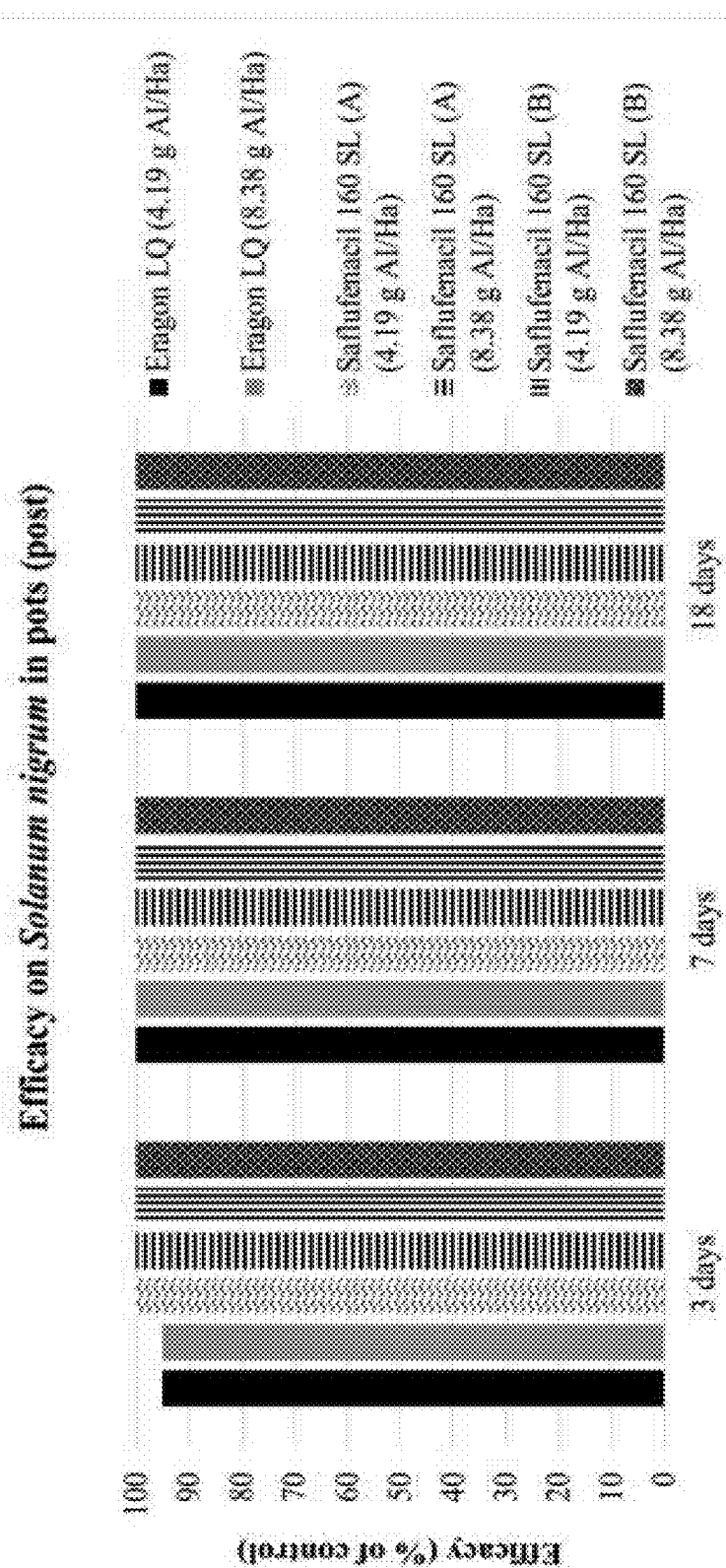
FIG. 3 shows the efficacy of Eragon® LQ, Saflufenacil 160 SL (A) and Saflufenacil 160 SL (B) on *Solanum nigrum* at 3 days, 7 days and 18 days after post-emergence spray application.

The results are shown in FIG. 3.

Conclusion

Example 4a-c, Protocol 1

Results clearly show that the SL formulations of saflufenacil are effective against various types of weed. In fact, results show that the SL formulations of saflufenacil has exterminated all 3 kinds of weed, i.e. *Chenopodium album,*

*Xanthium strumarium* and *Solanum nigrum*, in pots, using various concentrations as shown in protocol 1.

Example 5

Efficacy of Saflufenacil SL Formulations (Protocol 2)

All seeds were sown in plastic pots (8 cm diameter and 10.5 cm deep) filled with Newe Ya'ar soil (medium-heavy clay-loam soil). Each treatment was performed in 5 repetitions. The spray application was performed using motorized sprayer equipped with a flat fan 8001E nozzle 4 and operated at a pressure of 300 kPa, at 20 L/dunam spray volume. The pots were transferred to a heated greenhouse (35–20° C.) at Newe Ya'ar Research Center in Israel and were sprinkler-irrigated to field capacity four hours after herbicide application. weeds development was visually estimated at scale of 0-100% (0=dead plants, and 100=healthy vigorous plants) once a week and at the end of the trial to examine efficacy and selectivity of the applied herbicides.

The saflufenacil formulations were applied post-emergence. Table 8 below summarizes the application rates of the saflufenacil formulations. Eragon® LQ is a water-based suspension concentrate (SC) formulation sold by BASF (active ingredient: saflufenacil at a concentration of 342 g/L). Saflufenacil 160 SL (B) is the formulation of Example 1. Blank for Saflufenacil 160 SL (B) is the same formulation as Saflufenacil 160 SL (B) but without saflufenacil.

TABLE 8

| | | Application Rate | |
|---|---|---|---|
| # | treatment | L/Ha | g AI/Ha |
| 1 | Eragon® LQ (342 g/L) | 0.003 | 1.026 |
| 2 | Eragon® LQ (342 g/L) | 0.005 | 1.796 |
| 3 | Eragon® LQ (342 g/L) | 0.012 | 4.190 |
| 4 | Saflufenacil 160 SL (B) | 0.006 | 0.960 |
| 5 | Saflufenacil 160 SL (B) | 0.011 | 1.796 |
| 6 | Saflufenacil 160 SL (B) | 0.026 | 4.190 |
| 7 | Blank for Saflufenacil 160 SL (B) | 0.018 | 0.000 |
| 8 | Blank for Saflufenacil 160 SL (B) | 0.026 | 0.000 |
| 9 | Blank for Saflufenacil 160 SL (B) | 0.052 | 0.000 |

Example 5a

Efficacy of Saflufenacil SL Formulations on *Chenopodium Album* in Pots (Post-Emergence)

Saflufenacil formulations were applied on *Chenopodium album* in pots at rates shown in Table 9 below. The efficacy (% control) at 3 days, 10 days and 18 days after spray application (DAA) is also shown in Table 9 below.

TABLE 9

| | | Application Rate | | % Control | | |
|---|---|---|---|---|---|---|
| # | treatment | L/Ha | g AI/Ha | 3 DAA | 10 DAA | 18 DAA |
| 1 | Eragon® LQ (342 g/L) | 0.003 | 1.026 | 10% | 25% | 30% |
| 2 | Eragon® LQ (342 g/L) | 0.005 | 1.796 | 10% | 10% | 15% |
| 3 | Eragon® LQ (342 g/L) | 0.012 | 4.190 | 30% | 35% | 35% |
| 4 | Saflufenacil 160 SL (B) | 0.006 | 0.960 | 10% | 15% | 20% |
| 5 | Saflufenacil 160 SL (B) | 0.011 | 1.796 | 40% | 30% | 20% |
| 6 | Saflufenacil 160 SL (B) | 0.026 | 4.190 | 70% | 60% | 60% |
| 7 | Blank for Saflufenacil 160 SL (B) | 0.018 | 0.000 | 0% | 0% | 0% |
| 8 | Blank for Saflufenacil 160 SL (B) | 0.026 | 0.000 | 0% | 0% | 0% |
| 9 | Blank for Saflufenacil 160 SL (B) | 0.052 | 0.000 | 0% | 0% | 0% |

Figure 4:
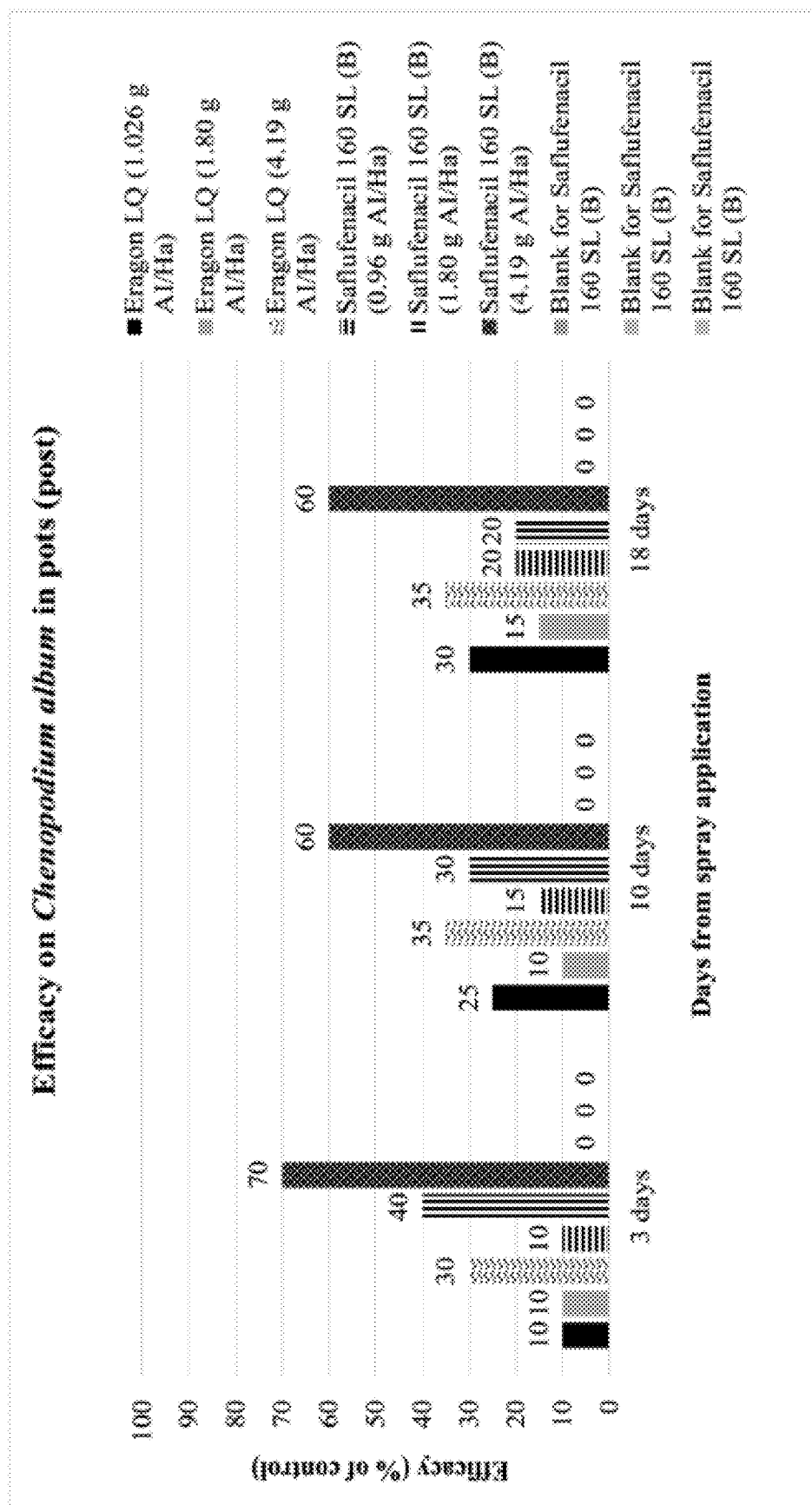
FIG. 4 shows the efficacy of Eragon® LQ, Saflufenacil 160 SL (B) and Blank for Saflufenacil 160 SL (B) on *Chenopodium album* at 3 days, 10 days and 18 days after post-emergence spray application.

The results are shown in FIG. 4.

Example 5b

Efficacy of Saflufenacil Formulations on *Ribes Nigrum* in Pots (Post-Emergence)

Saflufenacil formulations were applied on *Solanum nigrum* in pots at rates shown in Table 10 below. The efficacy (% control) at 7 days, 11 days and 22 days after spray application is also shown in Table 10 below.

TABLE 10

| | | Application Rate | | % Control | | |
|---|---|---|---|---|---|---|
| # | treatment | L/Ha | g AI/Ha | 3 DAA | 10 DAA | 18 DAA |
| 1 | Eragon® LQ (342 g/L) | 0.003 | 1.026 | 30% | 15% | 5% |
| 2 | Eragon® LQ (342 g/L) | 0.005 | 1.796 | 80% | 60% | 50% |
| 3 | Eragon® LQ (342 g/L) | 0.012 | 4.190 | 95% | 85% | 70% |
| 4 | Saflufenacil 160 SL (B) | 0.006 | 0.960 | 50% | 30% | 10% |
| 5 | Saflufenacil 160 SL (B) | 0.011 | 1.796 | 95% | 85% | 65% |
| 6 | Saflufenacil 160 SL (B) | 0.026 | 4.190 | 100% | 100% | 100% |
| 7 | Blank for Saflufenacil 160 SL (B) | 0.018 | 0.000 | 0% | 0% | 0% |
| 8 | Blank for Saflufenacil 160 SL (B) | 0.026 | 0.000 | 0% | 0% | 0% |
| 9 | Blank for Saflufenacil 160 SL (B) | 0.052 | 0.000 | 0% | 0% | 0% |

Figure 5:
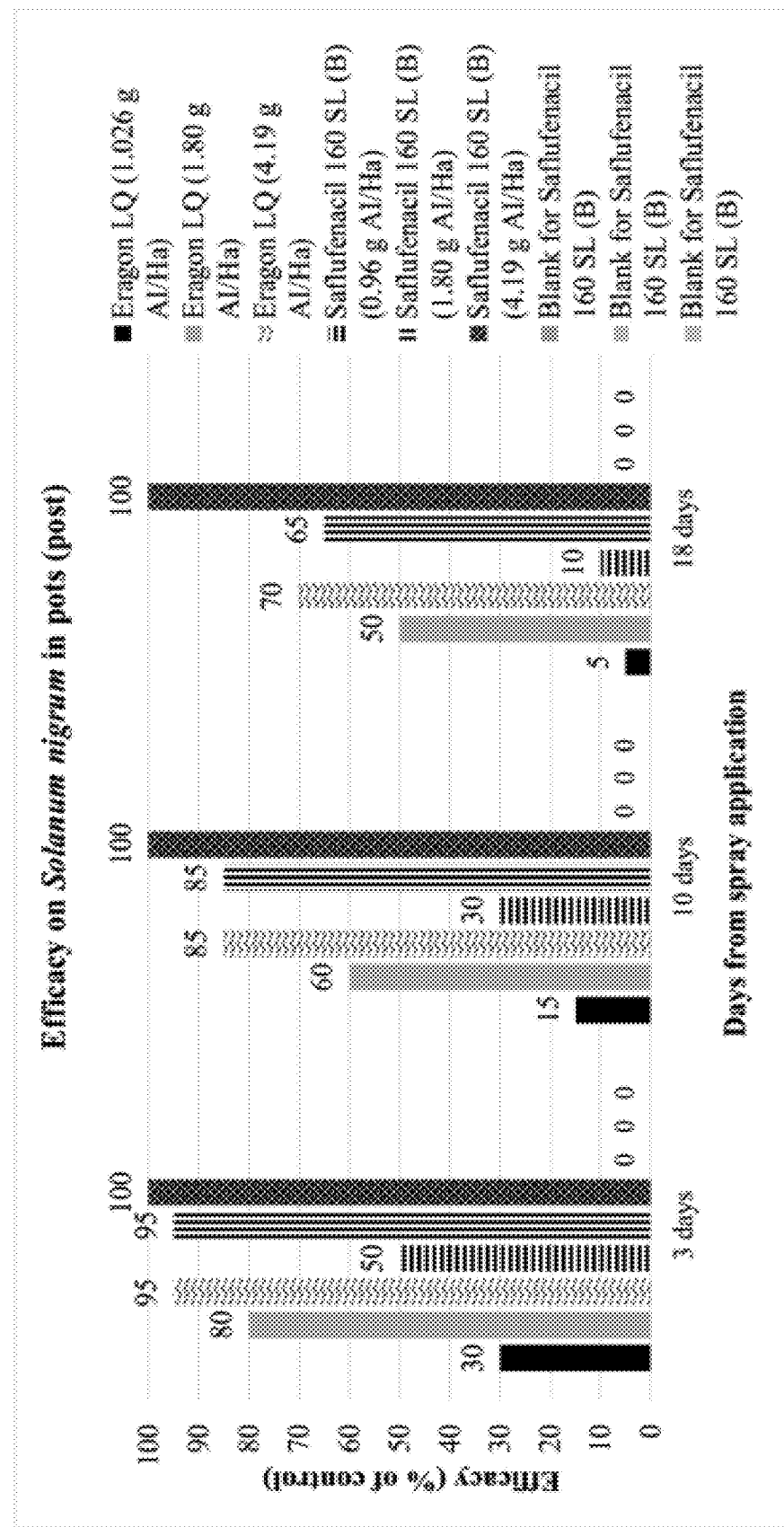
FIG. 5 shows the efficacy of Eragon® LQ, Saflufenacil 160 SL (B) and Blank for Saflufenacil 160 SL (B) on *Solanum nigrum* at 3 days, 10 days and 18 days after post-emergence spray application.

The results are shown in FIG. 5.

Conclusion

Example 5a-b, Protocol 2

Results clearly show that the SL formulation of saflufenacil is much more potent and effective against weed than the SC formulation of saflufenacil. The SL formulation exterminated all 3 kinds of weed, i.e. *Xanthium strumarium* L., *Ribes nigrum* and *Chenopodium*.

Example 6

Biological Examples

A synergistic effect is present if the action of the combination of active ingredients exceeds the total of the actions of the individual components. The expected action E for a given combination of active ingredients can be described by the so-called COLBY formula and can be calculated as follows (COLBY, S.R. "Calculating synergistic and antagonistic responses of herbicide combination". Weeds, Vol. 15, pages 20-22; 1967) ppm=milligrams of active ingredient (=a.i.) per liter of spray mixture X=% action caused by active ingredient I at a rate of application of p ppm of active ingredient Y=% action caused by active ingredient II at a rate of q ppm of active ingredient E=expected action of active ingredients I+II at a rate of application of p+q ppm of active ingredient (additive action), X-Y then Colby's formula reads E=X+Y−100

If the actually observed action (O) exceeds the expected action (E), the action of the combination is superadditive, i.e. there is a synergistic effect. O E=factory of synergism (FS).

The invention claimeed is:

1. A stable soluble liquid (SL) composition comprising (i) an amount of saflufenacil and (ii) an amount of an organic base, wherein:
   a) the composition is substantially water-free,
   b) the organic base is an amine,
   c) the amount of saflufenacil in the SL composition is from about 0.1% to about 70% by weight, based on the total weight on the composition, and
   d) the amount of the organic base in the composition is about 0.1% to about 80% by weight, based on the total weight on the composition.

2. The stable SL composition of claim 1, wherein the amine is a primary amine.

3. The stable SL composition of claim 1, wherein:
   a) the amine is a primary amine and the primary amine is $R_1$—$NH_2$, wherein $R_1$ is a C1-C6 alkyl group, or
   b) the amine is a secondary amine and the secondary amine is R1—NH-R2, wherein R1 and R2 are each C1-C3 linear alkyl groups.

4. The stable SL composition of claim 1, wherein:
   a) the amine has a pKa in the range of 4-11, and/or
   b) the amine is selected from the group consisting of pyridine, diethanolamine, dimethylamine in tetrahydrofurane (THE), butylamine, dipropylamine, and ethoxylated fatty acid amine.

5. The SL stable composition of claim 1, wherein the amine is ethoxylated coconut fatty acid amine.

6. The stable SL composition of claim 1, wherein
   the amine comprises at least one amine group and wherein the saflufenacil and the amine in the composition has a ratio where the ratio of amine groups to saflufenacil molecule is at least 1:1.

7. The stable SL composition of claim 1, wherein the composition comprises an amount of at least one additive, at least one agriculturally acceptable carrier, and/or at least one additional pesticide.

8. The stable SL composition of claim 1, wherein the composition comprises:
   (i) about 15% by weight of saflufenacil, based on the total weight of the composition,
   (ii) about 62% by weight of an amine, based on the total weight of the composition, and
   (iii) about 23% by weight of an agriculturally acceptable carrier, based on the total weight of the composition.

9. The stable SL composition of claim 1, wherein the amount of saflufenacil is dissolved in the organic amine.

10. A package comprising the stable SL composition of claim 1.

11. The stable SL composition of claim 3, wherein the primary amine is R1—NH2, wherein R1 is a C4 alkyl group.

12. The stable SL composition of claim 3, wherein the R1 and the R2 of the secondary amine are both methyl groups, ethyl groups, propyl groups or ethanol groups.

13. The stable SL composition of claim 1, wherein the composition comprises:
   (i) about 3% by weight of saflufenacil, based on the total weight of the composition,
   (ii) about 70% by weight of 2,4-D, based on the total weight of the composition,
   (iii) about 13% by weight of an amine, based on the total weight of the composition,
   (iv) about 4% by weight of an emulsifier, based on the total weight of the composition,
   (v) about 2.5% by weight of a surfactant, based on the total weight of the composition, and
   (vi) about 8% by weight of an agriculturally acceptable carrier, based on the total weight of the composition.

14. A method of controlling and/or preventing pests comprising applying an effective amount of the stable SL composition of claim 1 to a locus where the pest is to be controlled and/or prevented so as to thereby control and/or prevent the pest.

15. The method of claim 14, wherein the pest is weed.

16. The method of claim 14, wherein the stable SL composition is applied at an amount from about 0.001 L/ha to about 0.2 L/ha, and/or wherein the stable SL composition is applied at an amount from about 0.01 g/ha of saflufenacil to about 15 g/ha of saflufenacil.

17. A process for preparing the stable SL composition of claim 1, wherein the process comprises:
   (a) obtaining the amount of saflufenacil and the amount of the organic base,
   (b) mixing the saflufenacil and the organic base obtained in step (a) to obtain the SL composition.

\* \* \* \* \*